OR 3,797,911

United Sta
Kogelnik et al.

[11] 3,797,911
[45] Mar. 19, 1974

[54] THIN FILM OPTICAL COUPLERS EMPLOYING MODE CONVERSION

[75] Inventors: Herwig Werner Kogelnik, Fair Haven; Thomas Patrick Sosnowski, Colts Neck, both of N.J.

[73] Assignee: Bell Telephone Laboratories, Incorporated, Murray Hill, Berkeley Heights, N.J.

[22] Filed: Oct. 18, 1972

[21] Appl. No.: 298,785

[52] U.S. Cl. ............................................ 350/96 WG
[51] Int. Cl. ............................................... G02b 5/14
[58] Field of Search ............................... 350/96 WG

[56] References Cited
UNITED STATES PATENTS

| | | | |
|---|---|---|---|
| 3,614,198 | 10/1971 | Martin et al. | 350/96 WG |
| 3,610,727 | 10/1971 | Ulrich | 350/96 WG |
| 3,694,055 | 9/1972 | Bergman et al. | 350/96 WG X |
| 3,695,745 | 10/1972 | Furukawa | 350/96 WG |

OTHER PUBLICATIONS

Wang et al., "Studies of Magnetooptic Effects for Thin–Film Optical–Waveguide Applications" IEEE Transactions on Magnetics, Vol. Mag. 7, No. 3, Sept. 1971, pp. 385–387.

Primary Examiner—John K. Corbin
Attorney, Agent, or Firm—W. L. Wisner

[57] ABSTRACT

An input-output coupler for thin film optical waveguides is disclosed in which the substrate is anisotropic with its optic axis parallel to the plane of the film and the film index is intermediate the substrate indices. The input beam is appropriately polarized and directed through the substrate toward the film. The input beam is propagated obliquely to the optic axis during coupling and is propagated in a direction either orthogonal or parallel to the optic axis during guiding. The oblique propagation involves some conversion between TE and TM waves. Essentially, the input waves and the output waves of this coupling technique correspond to leaky guided waves in the film.

8 Claims, 9 Drawing Figures

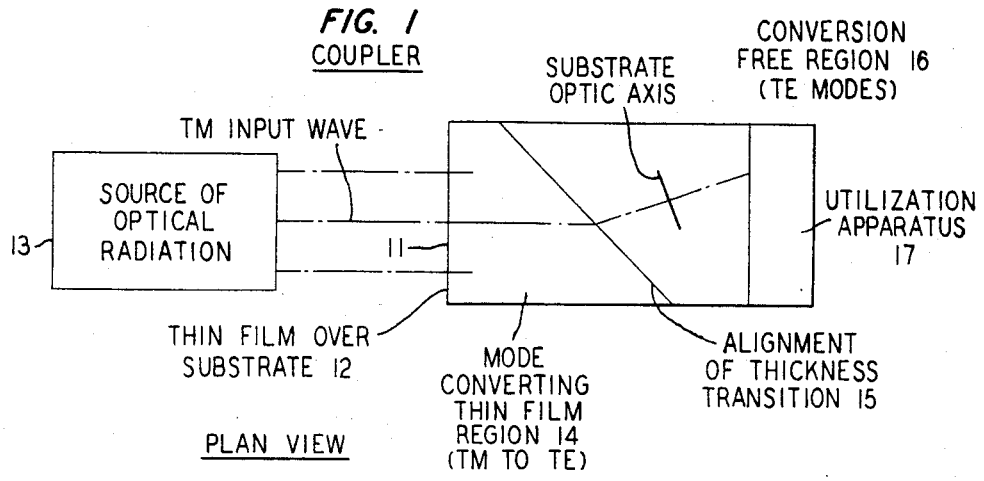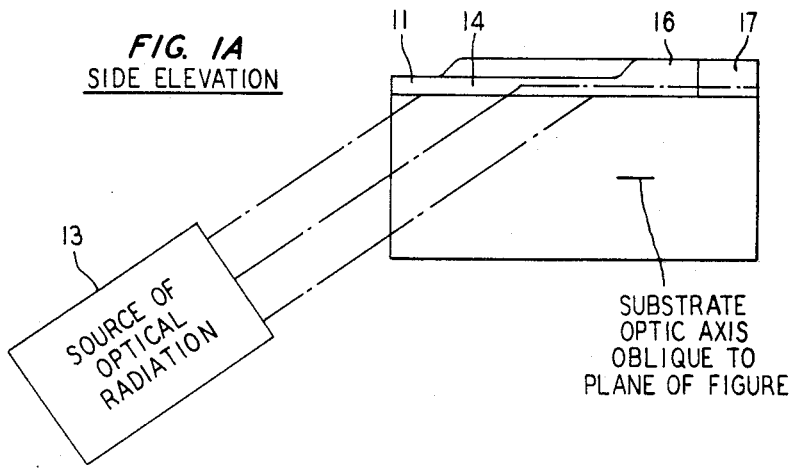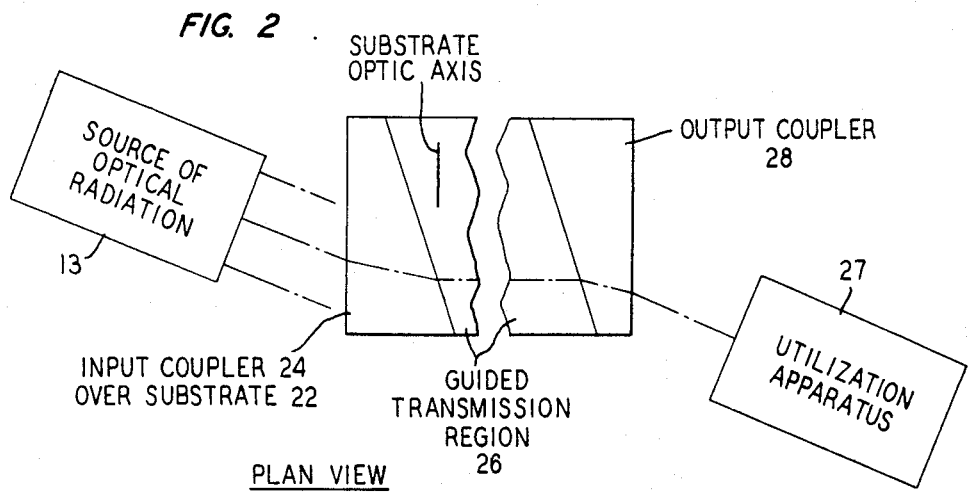

TWO STEP COUPLER

THIN FILM OPTICAL COUPLERS EMPLOYING MODE CONVERSION

BACKGROUND OF THE INVENTION

This invention relates to couplers for use with optical circuits, such as thin film waveguide type circuits.

Since lasers were first developed, it has been known that coherent light can be concentrated in advantageous ways for proposed uses in communication. For example, the processes of modulation and frequency shifting are most easily performed with concentrated coherent light. Moreover, coherent light can be advantageously concentrated in an optical fiber or thin film waveguide of an appropriate material.

It has also been realized that it is extremely difficult to couple coherent light through the thin edge or end of such an otpical waveguide without incurring substantial losses.

To meet that problem at least two ways have been developed to couple light through the major surface of a thin film type waveguide, stripguide or analogous optical waveguide. One of these techniques is called the prism-film coupler and is described in U.S. Pat. No. 3,584,230, issued June 8, 1971 to P. K. Tien. Another technique is known as the grating-film coupler; and different versions are described in the copending patent applications of A. Ashkin et al., Ser. No. 40,079, filed May 25, 1970, now U.S. Pat. No. 3,674,335 and assigned to the assignee hereof, and to H. W. Kogelnik, Ser. No. 67,857, filed Aug. 28, 1970, now U.S. Pat. No. 3,674,336 and assigned to the assignee hereof.

The most substantial projected future applications for waveguide optics involve what could be called integrated optical circuits. In such circuits, the use of a bulky prism, such as in the prism-film coupler, defeats much of the advantage of the integrated circuitry and, moreover, is difficult to employ in a practical use environment. While the grating-film coupler is more compact, it involves sophisticated fabrication techniques.

It would be desirable to have a coupling technique for thin film type optical waveguides in which the preceding problems are avoided.

SUMMARY OF THE INVENTION

According to our invention, an input-output coupler for a thin film optical waveguide employs an anisotropic substrate with its optic axis parallel to the plane of the film and a waveguiding film of index intermediate the substrate indices.

It has been discovered that, if the light is propagated toward a major surface of the film in a direction oblique to the optic axis, the film-substrate combination is leaky for certain types of optical waves, such as TM waves, and will produce some conversion between TM and TE waves. This leaky condition combined with the TE-TM conversion has been recognized by us as being precisely the condition needed for coupling.

We have further discovered that if the propagation direction of the light is changed immediately after coupling so that the propagation is in a direction orthogonal or parallel to the optic axis, then any non-leaky modes already propagating in the film will continue to be guided in the film without loss, either from mode conversion or leakage.

While some specific embodiments of our invention employ optical stripguides, which include basically well-defined strips of waveguiding dielectric thin film, other species of our invention employ a purely planar thin film waveguide geometry in that the lateral extent of the film is not sufficiently limited to provide guiding of the light with respect to that dimension.

BRIEF DESCRIPTION OF THE DRAWING

Further features and advantages of our invention will become apparent in the following detailed description, taken together with the drawings, in which:

FIG. 1 is a partially pictorial and partially block diagrammatic illustration of a planar input coupler according to our invention;

FIG. 1A shows a side elevation of the embodiment of FIG. 1;

FIG. 2 shows a modification of the embodiment of FIG. 1 having both input and output coupling;

DETAILED DESCRIPTION

General Technical Basis of the Invention

Figure 3:
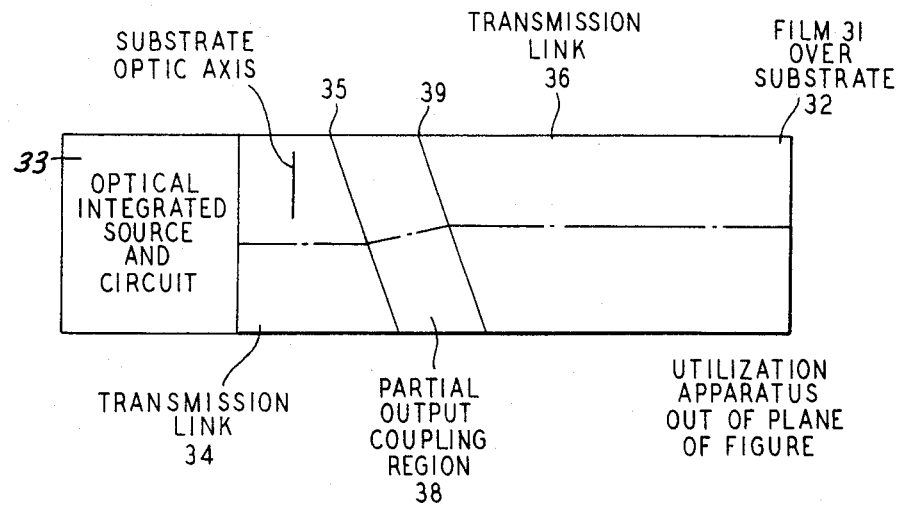
FIG. 3 is a partially pictorial and partially block diagrammatic illustration of an optical transmission link providing a partial output coupling in a selected region.

It has previously been demonstrated by one of us, T. P. Sosnowski, that thin film waveguide structures, which are loaded by anisotropic substrate media like calcite, are able to support waves of only a selected polarization as guided waves, if the respective refractive indices are appropriately chosen. Other polarizations will leak from the guide. For example, if $$n_e < n_f < n_o$$

where $n_e$ the extradordinary index of the negative uniaxial anisotropic substrate, $n_f$ is the index of the isotropic film, and $n_o$ is the ordinary index of the substrate, and if the TE wave is supported when the optic axis is perpendicular to the direction of propagation, then the TM waves leak from the guide.

The discovery on which our invention is based shows that if the angle between the optic axis and the direction of propagation deviates from 90° or 0° mode conversion takes place which increases with the angular deviation. It is this mode conversion that is the basis for the devices disclosed hereinafter.

Specific Embodiment

In the embodiment of FIG. 1, a thin film 11 is disposed in contact with an underlying negative uniaxial anisotropic substrate 12 (not shown). The direction of the optic axis of the substrate is superimposed upon the diagram of thin film 11, even though substrate 12 is hidden by thin film 11, since the view of FIG. 1 is a plan view.

Vertically-polarized coherent optical radiation corresponding to a lossy TM-mode wave in film 11 is supplied from a source 13, for example, a laser, in such a direction that it propagates toward and along a major surface of the film 11 through substrate 12, as shown in the side elevation of FIG. 1A, in a direction oblique to the substrate optic axis. This oblique propagation continues throughout the mode-converting thin film region 14 and is important to the input coupler according to our invention. Substantially all of the light pathlength in region 14 is illuminated by the input light through the substrate. Immediately beyond region 14 along the path of propagation of the radiation lies a thickness transition 15 which has an alignment also oblique to the propagation path of the light, but at a smaller acute angle than the substrate optic axis. This thickness transition 15 provides the means for redirecting the light in the film to propagate in a direction orthogonal to the optic axis so that the non-leaky portion thereof, for example, the TE modes, can continue to propagate without loss thereafter in the mode-conversion-free region 16 until the utilization apparatus 17 is reached. For example, if the light from source 13 were modulated as is assumed here for purposes of illustration, utilization apparatus 17 could be a detector.

In the operation of the embodiment of FIG. 1, the wave-converting region 14 is leaky to a TM wave. Upon interacting with the film-substrate interface, the TM wave is partially converted to a TE wave. When the TM wave has the proper incidence angle, the generated TE wave is phase-matched to a guided TE wave and propagation occurs. Since the TE-wave is propagating at an angle to the optic axis other than 90° or 0°, it would be partially reconverted to a TM wave. By changing the guided TE wave propagation direction to that normal to the optic axis, we inhibit TE-TM conversion. The TE wave thus propagates substantially without loss, since it is also non-leaky. While some of the TE wave may be converted back to TM wave which leaks out, whatever TE wave is present at the thickness transition 15 will be redirected by the prism-like effect of the transition between regions 14 and 16 so that it propagates orthogonally to the substrate optic axis. Thereafter, it propagates without mode conversion and thus essentially loss-free.

The strength of the coupling can be varied by changing the angle between the initial propagation direction of the light from source 13 and the substrate optic axis.

As has been shown with the other couplers in the optical waveguide art, a device which serves as an input coupler when illumination from outside is predominant is reciprocal in that it also serves as an output coupler when the light inside the waveguiding film predominates in effect over light outside the waveguiding film. Again, it is the same leaky property of the mode-converting film that is used for the output coupler.

Thus, in FIG. 2 the substrate 12 has deposited thereover an input coupler 24 like region 14 of FIG. 1, a guided transmission region 26 of the thin film like region 16 of FIG. 1 and an output coupler 28. Output coupler 28 is essentially similar to input coupler 24, but is not subjected to light from the source 13. The direction of the input beam propagation and output beam propagation and the direction of the substrate optic axis in FIG. 2 have been altered so that symbolically it can be appreciated that the guided transmission region 26 can be indefinitely long as would be needed in an optical communication link or other transmission circuit.

It should also be clear that not all of the light guided in a thin film need be coupled out at one time. A small portion or portions can be coupled out at a selected region or at different regions. A transmission link showing this principle is illustrated in FIG. 3. In FIG. 3, the optical source 33 is illustratively integrated with the device including thin film 31 over substrate 32. Input coupling to film 31 may use any known technique. In the transmission regions 34 and 36, the direction of light propagation is orthogonal to the substrate optic axis and the light is polarized in the plane of the film so that it propagates as a guided TE wave without conversion. In the partial output coupling region 38, the prism-like effect of an oblique thickness transition is again used to redirect the light, this time so that it propagates obliquely to the substrate optic axis and provides partial output coupling as the TE wave is paritally converted to a leaky TM wave. At the second thickness transition 39, the light is redirected so that the remaining TE mode propagates without further polarization conversion. While the ultimate utilization of the remaining light is not illustrated further, portions of it could be coupled out at subsequent points.

It is not necessary that the redirection of the coupled optical wave in the thin film occur in a single step. For example, it may occur in a plurality of discrete steps as shown in the two-step coupler of FIG. 4.

Figure 4:
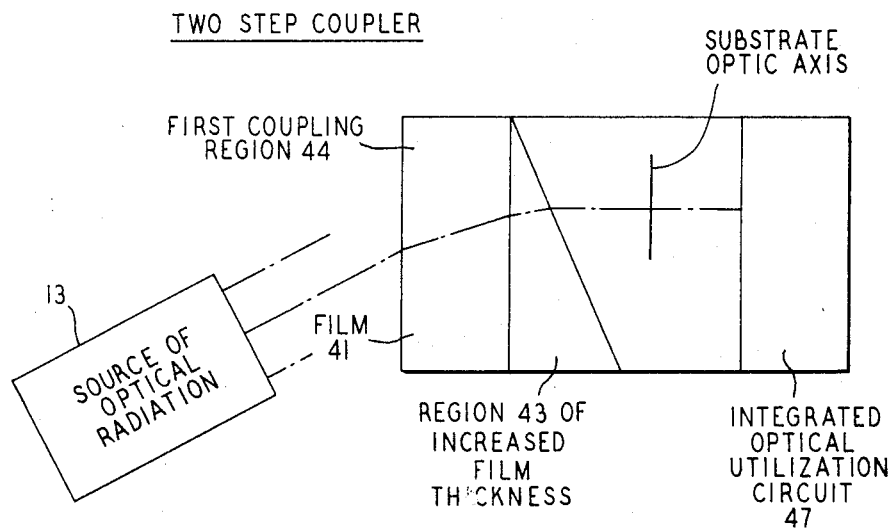
FIG. 4 shows a partially pictorial and partially block diagrammatic illustration of a two-step coupler.

The apparatus of FIG. 4 differs from the apparatus of FIG. 1 primarily in that the mode-converting or coupling region 14 of FIG. 1 is replaced in FIG. 4 by a first coupling region 44 and a second coupling region 43, which is a region of increased film thickness.

In operation it may be seen that the leaky wave propagating in the first coupling region 44 is redirected more nearly orthogonal to the substrate optic axis by the first transition region of the region 43. This transition is essentially parallel to the substrate optic axis, but could have any other orientation sufficient to provide merely a partial redirection of the guided light. In the region 43 of increased thickness, the redirection of the light is basically similar to that that occurs in a bulk optical prism, the shape of which region 43 resembles in the plane view of FIG. 4. That is, the light is bent toward the normal to the transition between regions 44 and 43. Upon leaving region 43 in the direction oblique to the transition between region 43 and the subsequent region of thin film 41, the light is bent away from the normal to that transition. The orientation of this second transition is chosen so that the second bending of the light renders the propagation direction normal to the substrate optic axis. The action of the region 43 of increased thickness is an application of the principles of thin film prisms as disclosed in U.S. Pat. No. 3,614,198 of R. J. Martin et al.

Figure 5:
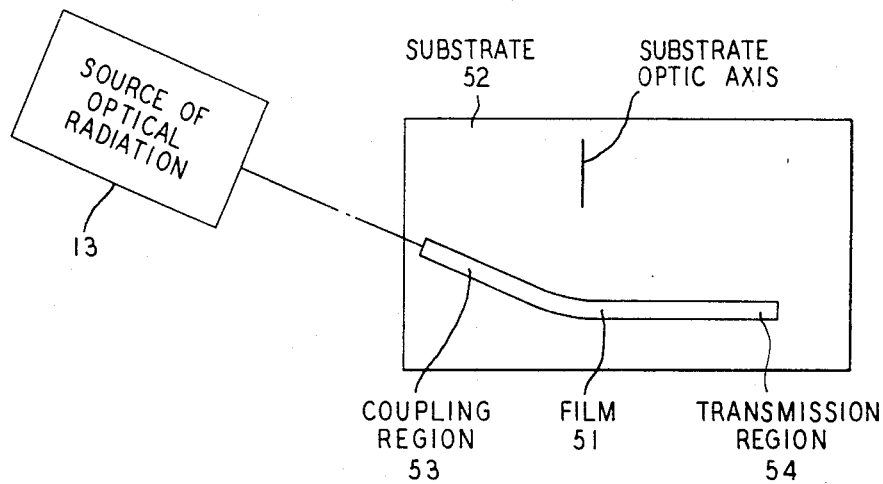
FIG. 5 shows a partially pictorial and partially block diagrammatic illustration similar to the first discovered stripguide-type embodiment of our invention.

Just as our invention can be practiced with planar film waveguide optics, it can also be practiced with dielectric stripguides disposed on anisotropic substrates. In the embodiment of FIG. 5, the dielectric stripguide 51, which is basically an appropriately selected section of a dielectric thin film, is disposed on an anisotropic substrate 52 so that a major portion of the stripguide, designated transmission region 54, has its principle direction orthogonal to the substrate optic axis. A minor portion of the guide 51, called the coupling region 53, is oriented oblique to the substrate optic axis from its beginning point to its junction with transmission region 54, and serves as the leaky guide through which coupling can occur. The radiation from source 13 is incident on its major surface and is polarized as a leaky wave, for example, a TM wave when substrate 52 is a negative uniaxial crystal.

Figure 6:
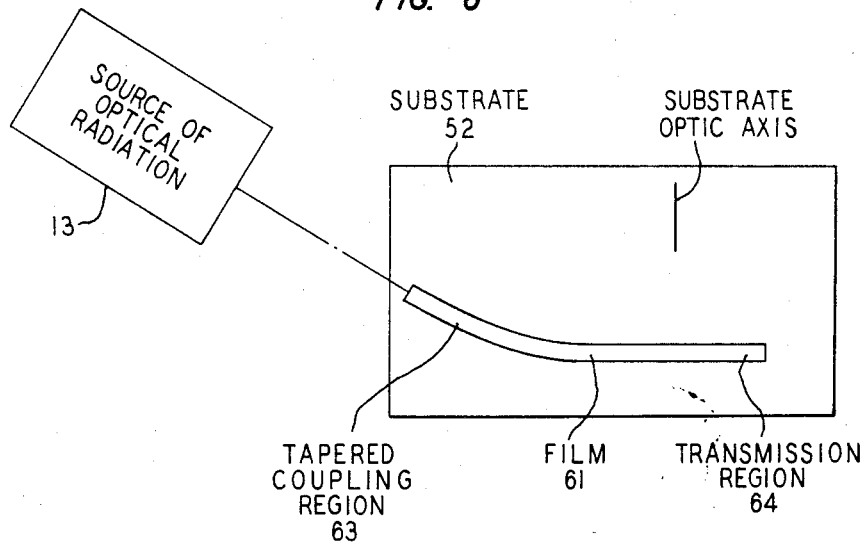
FIG. 6 shows a modification of the embodiment of FIG. 5 using a tapered-strength coupler.

A further extension of the foregoing principles is that the redirection of the light can occur in a continuous transition throughout the coupling region itself. We designate such a coupler as a tapered-strength coupler, such as the tapered-strength coupler region 63 of the embodiment of FIG. 6. Here the transmission region 64 is essentially similar to the transmission region 54 of FIG. 5 and is tangent to the curvature of the coupler region 63 at their junction. The tapered coupler region 63 is continuously curved so that in essence the redirection of the light in the thin film stripguide 61 occurs in an infinitely large number of steps, in other words, continuously. Correspondingly, the incremental degree or strength of coupling falls off continuously as the light is redirected.

In the planar waveguide geometries of FIGS. 1–4, the same tapered-strength coupling can be achieved by tapered changes of thickness in which the contours of constant thickness become gradually more parallel to the substrate optic axis.

Figure 7:
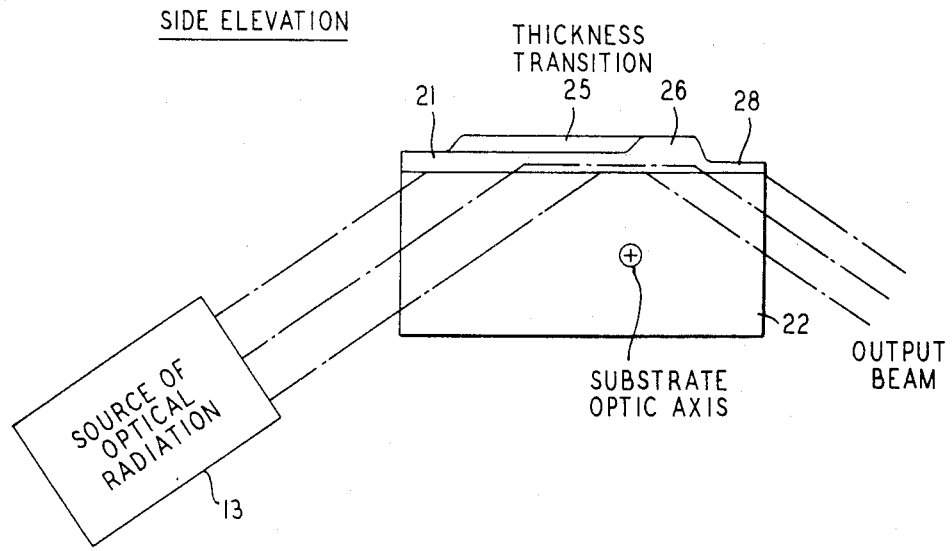
FIG. 7 is a side elevation of FIG. 2.

It is characteristic of our invention that the input light is coupled into the leaky guide through the substrate into the thin film. This characteristic results from the smaller difference in index between the substrate and film as compared to the difference between the film and its other bounding medium. Thus, in FIG. 7, shown as a side elevation which could be the side elevation of the embodiment of FIG. 2, the source 13 is disposed to direct the beam of coherent light through a lateral surface of substrate 22 toward film 21. As the leaky coupling occurs ahead of the oblique transition region 25, light is coupled into a guided mode in the film 21, and is eventually redirected normal to the substrate optic axis in the region 26 following transition region 25 so that mode conversion loss is minimized. The guided light is finally coupled out through output coupler region 28 following another oblique transition region. It may be seen in FIG. 2 that the direction of propagation of the beam from source 13 is not purely in the plane of the figure of FIG. 7, but also has a component orthogonal to the plane of the figure.

These relationships can be maintained while still integrating the source of the optical beam with the coupler and waveguide circuit by appropriately joining a laser source to the substrate material.

Figure 8:
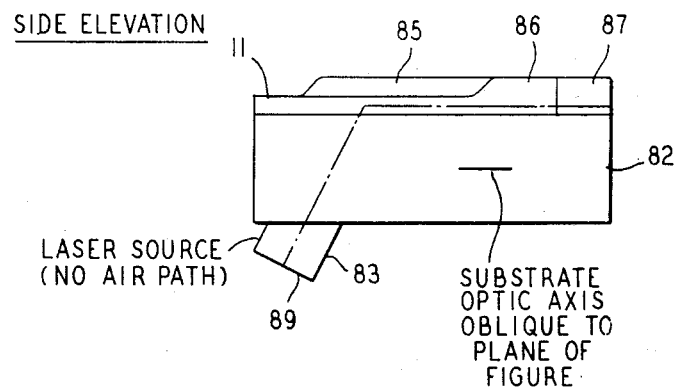
FIG. 8 illustrates an integrated-circuit modification of FIG. 1A.

An example of such an integrated device is shown in FIG. 8. The side elevation view of FIG. 8 can be assumed to be a modification of the side elevation of FIG. 1A. Laser source 82 is a solid-state, either a dielectric crystal laser or a semiconductor injection laser, pumped by means not shown, joined to the bottom major surface of substrate 82 and directed toward the thin film 11 in a direction that is oblique both to the plane of thin film 11 and also oblique to the substrate optic axis. The interface surface of laser 83 with substrate 82 is beveled with respect to the laser axis to achieve this result. It will be readily apparent, therefore, that the laser source 82 must be a relatively high gain laser so that stimulated emission is achieved with only a sole reflection from the back surface 89, or else a second reflective surface forming the optical resonator needs to be formed parallel to surface 89 in laser 83 short of the interface with substrate 82.

In all of the foregoing embodiments, the anisotropic substrate should typically be a calcite single crystal, which is particularly well adapted by use with thin films of various plastics. For example, the plastic thin film could be polystyrene. From the foregoing basic principles, it is straightforward to calculate the exact design parameters of each of the foregoing embodiments for a given laser frequency to which the film and substrate are transparent.

It should be understood that, while in all of the foregoing embodiments the leaky wave was assumed to be a TM wave in the film, substrates with the reverse type of birefringence or anisotrophy, e.g., positive uniaxial birefringence, can be found which will readily provide that the TE mode is the leaky mode. In that case, in contrast to Equation (1) above, $$n_o < n_f < n_e .$$

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

We claim:

1. Apparatus comprising a transparent optical body having at least one dimension of the order of the wavelength of light to be guided therein, an anisotropic substrate for said body having an optic axis parallel to the interface of said body and said substrate, said substrate having one of its ordinary and extraordinary indices greater than the index of refraction of said body and the other of said indices smaller than the index of refraction of said body, and means for coupling said light into said body for guiding therein, comprising means for propgating said light in a direction oblique to said optic axis onto a major surface of said body in a mode for which said body acts as a leaky guide and means for redirecting the portion of said light propagating in said body in a direction nonoblique to said axis.

2. Apparatus according to claim 1 in which the means for redirecting said light in said body comprises a prism-like region of said body providing light propagation properties differing from those of the surrounding portion of said body.

3. Apparatus according to claim 1 in which the body comprises a dielectric stripguide and the means for redirecting said light in said body comprises a curved disposition of said stripguide on the substrate in which disposition a substantial portion of said stripguide lies in a direction orthogonal or parallel to the direction of the axis of the substrate.

4. Apparatus according to claim 1 in which the source supplies the optical radiation through the substrate to the interface of the guide and said substrate.

5. Apparatus according to claim 6 in which the source is integrated with the substrate.

6. Apparatus according to claim 1 including means for coupling light from said body, comprising means for redirecting said light in said body in a direction oblique to the substrate optic axis.

7. Apparatus comprising a transparent optical dielectric stripguide, a substrate for said guide having an optic axis parallel to the interface of said guide and said substrate, said substrate having one of its ordinary and extraordinary indices of refraction greater than the index of refraction of said guide and the other of said indices smaller than the index of refraction of said guide, said guide hving a major portion extending in a direction nonoblique to the substrate optic axis and having a minor portion extending in a direction oblique to the substrate optic axis, and a source of optical radiation supplied to a major surface of said minor portion with a component of its propagation direction along the direction of said minor portion and polarized to couple to a leaky mode of said minor portion.

8. Apparatus according to claim 7 in which the minor portion of the guide is continuously curved to a point of tangency with said major portion.

* * * * *